Dec. 12, 1967 A. JENSEN 3,358,192

UNITARY MULTIPLE SOLID STATE SWITCH ASSEMBLY

Filed May 4, 1965

United States Patent Office 3,358,192
Patented Dec. 12, 1967

3,358,192

UNITARY MULTIPLE SOLID STATE SWITCH ASSEMBLY

Arne Jensen, Havnberg, Als, Denmark, assignor to Danfoss A/S, Nordborg, Denmark, a company of Denmark Filed May 4, 1965, Ser. No. 453,157
Claims priority, application Germany, May 5, 1964, D 44,333
2 Claims. (Cl. 317—101)

ABSTRACT OF THE DISCLOSURE

A unitary body of polycrystalline material including a first set of parallel conductors in ohmic contact on one side. A second pair of parallel conductors are disposed on the opposite side of the polycrystalline material. The two conductors are formed at an angle with respect to one another. The semiconductive material is characterized by being rendered conductive in the intermediate regions of the crossed conductors upon application of a potential to one of the conductors of a given pair of conductors the application of potential to one of the conductors establishes a current path in the semiconductive body in the region where the conductor under potential cross conductors of the other set and the remainder of the body will remain in a high resistance.

The present invention relates to a unitary multiple solid state switch assembly, and more particularly to such an assembly in which a polycrystalline body of material is applied over a plate which may form an electrode, and additional electrodes capable of independent operation are further applied to the polycrystalline layer.

Solid state switch elements include, for example multi-layer diodes, consisting of alloyed or diffused layers of impurities determining the conductivity of a semiconductor material. Such solid state switches operate not only upon being triggered by a separate impulse, but also when the field or potential thereacross is exceeded by a certain amount. As the current through the device drops these elements recover and switch back to their normal, high resistance state.

It is customary to manufacture such semiconductor switching elements separately, that is each device is applied to a separate chip or wafer of semiconductor material. Thus, the space requirements and manufacturing costs are comparatively high.

It is an object of the present invention to combine a plurality of switch elements in a single switching assembly.

Briefly, in accordance with the present invention, the material forming the separate elements is a unitary polycrystalline body applied over a support; the portion of this body between the electrodes forms a switch element, and the electrodes are so placed on the body that there is no interference between the switching functions of different electrodes.

Polycrystalline bodies operate in a different manner from the known single crystal layers of multiple layer diodes, in that each switching operation creates a new and discrete path for electrical current through the polycrystalline body, whereas in single crystal devices the entire crystal structure is believed to become conductive. The current path through a polycrystalline body, once established, has a relatively small cross-section, that is the current density is high. The regions beyond this particular current path, however, retain the resistance of the material itself, that is of a substantially high value so that insulation between the electrodes of adjacent switch elements is obtained.

It has been found that it is generally not possible to predict the exact point at which a current path between electrodes will be formed. It appears, however, that the path of the current is the shortest one between the electrodes of a switching system. It is thus ordinarily only necessary to arrange the electrodes in such a manner that the possible current paths of adjacent electrode pairs will not interfere with each other. If such interference is desired, however, for example if one electrode pair is to act similar to a trigger electrode, or to prepare a current carrying path, then the distance between adjacent electrodes may be chosen to be in the order of the distance between oppositely arranged electrodes. Thus, influencing one electrode path by another is also possible if such is desired.

A particularly simple form of the multi-electrode switch is provided by a body of monocrystalline material applied to a support or carrier plate. If the carrier plate itself is electrically conductive, for example of metal, it may serve as an electrode. The other side of the layer of polycrystalline material is provided with a plurality of electrodes. If the carrier is non-conductive, then electrodes may be embedded therein. The electrodes on the other side, of course, will be opposite the embedded electrodes. The layer of polycrystalline material itself may be applied by vapor deposition, evaporation or from a melt. It may also be applied by electrolytic cathodic deposition, or by flame or arc sputtering.

An electrical switching matrix may be formed by the multi-unit solid state switch by arranging electrodes in the form of strips on opposite sides of the polycrystalline layer in such a way that the strips are parallel to each other on one side, but that the parallel strips on opposite sides cross each other at an angle, for example at right angles. A grid switching arrangement is thus provided, in which intersections of oppositely located grids can be readily defined. Such an arrangement is readily manufactured by preparing a melt on a support plate having strip electrodes extending one direction embedded therein, and contacting the other side of the melt with the electrodes extending at an angle thereto as the melt begins to solidify. Of course, electrodes other than strips may also be applied to the melt as it solidifies.

The switching characteristics of the solid state switching elements according to the present invention can be arranged and adjusted to a certain extent by suitable choice of the thickness of the layer of the material, and its composition. A particularly interesting composition consists essentially of tellurium with additives from the elements of Groups IV and V of the Periodic Table of Elements. The solid state switch elements, which are polycrystalline, are symmetrical, that is they are not unidirectionally conductive. The current carrying capacity is high and their manufacture is simple. A mixture of 67.5% tellurium, 25% arsenic and 7.5% germanium may be applied to a plate. It can be sintered on, applied as a melt which is permitted to solidify, or vapor deposited. Solid state switching elements of such a composition have the electrical switching characteristics that when a certain threshold value of voltage or field across the electrodes applied thereto is exceeded, then the ordinary high resistance value of the layer, in the order of 1 or more megohms, is changed to a low resistance value, in the order of 1 ohm or less. The low resistance state will remain until the current through the element drops below a certain holding threshold value, at which time the region between electrodes will again change to the high current value.

A solid state switch having different electrical characteristics may be provided in accordance with the present invention by utilizing essentially tellurium with an additive of Group IV of the Period Table of Elements only. For example, a composition comprising 90% tellurium and 10% germanium may be applied to a support plate as before. The electrical characteristics of such a switch will be that when a certain threshold potential or voltage is exceeded between electrodes, it will switch from a high resistance state in the order of megohms to a low resistance state, in the order of an ohm or less. However, the material will not revert to a high resistance state when the holding current is dropped below a certain threshold value, but rather it will remain in its low resistance state until a second, and substantial threshold value of current therethrough is exceeded. This element thus switches ON upon a voltage pulse exceeding a certain value, and switches OFF upon a current pulse exceeding a certain value.

The structure, organization and operation of the invention will now be described more specifically in the following detailed description with reference to the accompanying drawings, in which.

Figure 1:
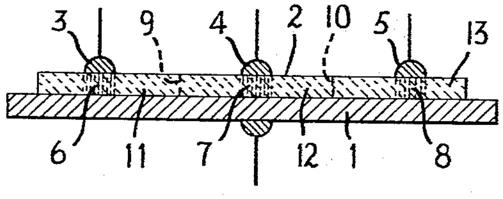
FIG. 1 illustrates a switch assembly according to the present invention with four electrodes.

Referring now to the drawings and particularly to FIG. 1: A metal support plate 1 has a layer 2 consisting of polycrystalline solid state switching substance applied thereto. Three electrodes 3, 4 and 5 are secured to layer 2. When a voltage exceeding the voltage threshold value is applied between plate 1 and any one of electrodes 3, 4 or 5, the current path through the polycrystalline material 2 will occur only in regions 6, 7 and 8, respectively that is, in the region below the extent of the electrodes 3, 4, 5. The remainder of layer 2 stays in its high resistance condition. Dashed lines 9, 10 theoretically show the line of separation between electrodes 3 and 4, and 4 and 5, respectively, which separate the entire unitary assembly into three switch elements 11, 12 and 13.

Figure 2:
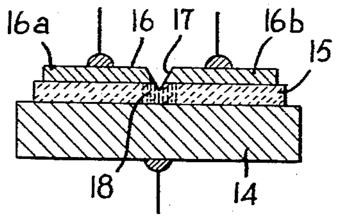
FIG. 2 is a different embodiment with three electrodes.

FIG. 2 illustrates a conductive support plate 14, having a polycrystalline solid state switching substance 15 applied thereto. An electrode layer 16 is applied over layer 15 and separated thereafter into two regions **16*a*, 16*b* by means of a separating notch 17. If electrode 14 and, for example 16*a*, has the potential applied thereacross, a current path will arise in the region 18. It is believed that the current path occurs in this region because a higher concentration of electrical field arises at the edge of region 16*a*, or because the uniformity of layer 15 is disturbed by the process forming or scratching notch 17. Since the distance between the two electrode portions 16*a* and 16*b* is less than the distance between any one of the electrode 16*a*, 16*b* and its support plate 14, the distance between electrode portion 16*b* and the current path 18 is less than the distance between the electrode 16*b* and 14. Thus, the voltage threshold potential necessary to switch the region between electrodes 16*b* and 14 is less than that necessary to switch regions 16*a* and 14. A control switching pulse applied between electrodes 16*a* and 14 can thus switch a lower potential main circuit connected between electrodes 16*b* and 14. The electrode layer 15 may be vapor deposited on support plate 14; likewise, electrode layer 16 may be vapor deposited or evaporated on the solid state switching material layer 15**.

The thicknesses of the layers themselves can be very small, for example in the order of microns.

Figure 3:
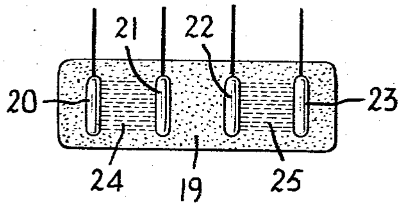
FIG. 3 shows a different embodiment with a different arrangement of electrodes.

FIG. 3 illustrates a different arrangement, in which solid state switching material 19 is made by permitting a melt to solidify. Four electrodes 20, 21, and 22, 23 are disposed in contact with the melt while it is still in molten condition; as the melt solidifies they are secured to the semiconductor switching material. Electrodes 20, 21 may be connected to one switching circuit, and electrodes 22, 23 to a different circuit. Thus, a conductive region can be established only within the regions 24, 25 so that good isolation between the circuits is obtained, although a unitary assembly is provided.

Figure 5:
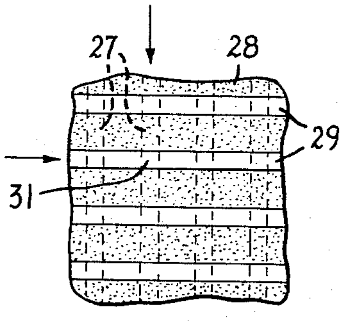
FIG. 5 is a plan view of the matrix of FIG. 4, with an insulation covering layer removed.
Figure 4:
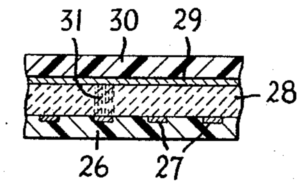
FIG. 4 is a sectional view through a solid state switching matrix.

FIGS. 4 and 5 illustrate a switching matrix. A plurality of a parallel electrodes formed as strips 27 are arranged on an insulating body 26. A layer 28 of polycrystalline solid states switching material is applied thereover. A plurality of parallel conductors 29, likewise secured to an insulating material 30 are placed above the layer of solid state switching material. The electrodes 29 are arranged in a direction so as to cross the electrodes 27. Placing a potential on the electrode strips indicated by arrows in FIG. 5, will cause a current path in the region 31 where the two electrodes cross. The remainder of the material will remain in its high resistance condition and a plurality of regions 31, if a number of conductors are energized, are separated from each other.

It will be understood that each of the elements and the steps described above may find useful application in other types of switching assemblies, different from the types described. Various structural changes and modifications, as determined by the requirements of particular applications or uses, may be made without departing from the inventive concept.

I claim:

1. A switching matrix comprising, a unitary body of polycrystalline semiconductive material, a first set of elongated spaced, parallel conductors in ohmic contact on one common side of said unitary body of polycrystalline material, a second set of elongated, spaced parallel conductors in ohmic contact on an opposite common side of said unitary body of polycrystalline material said first and second sets of conductors forming an angle with respect to one another, said semiconductive material having the characteristic of being rendered conductive in the regions intermediate respective joined cross conductors upon application of a potential to one of the conductors of a given pair of conductors, whereby upon application of potential to conductors of one of said sets of current path is established in the semiconductive body in the region where the conductor under potential cross conductors of the other set and the remainder of said body will remain in a high resistance.

2. A switching matrix according to claim 1, in which the conductors of said first set are substantially normal to the conductors of said second set.

References Cited

UNITED STATES PATENTS

| | | | |
|---|---|---|---|
| 2,994,121 | 8/1961 | Shockley | 317—101 |
| 3,241,009 | 3/1966 | Dewald et al. | 252—512 |
| 3,254,276 | 5/1966 | Schwarz et al. | 317—235 |
| 3,258,663 | 6/1966 | Weimer | 317—234 |

ROBERT K. SCHAEFER, *Primary Examiner.*

W. C. GARVERT, J. R. SCOTT, *Assistant Examiners.*